No. 828,821. PATENTED AUG. 14, 1906.
F. E. LOSEE.
MEANS FOR HARVESTING ICE IN THE FIELD.
APPLICATION FILED OCT. 24, 1905.
2 SHEETS—SHEET 1.
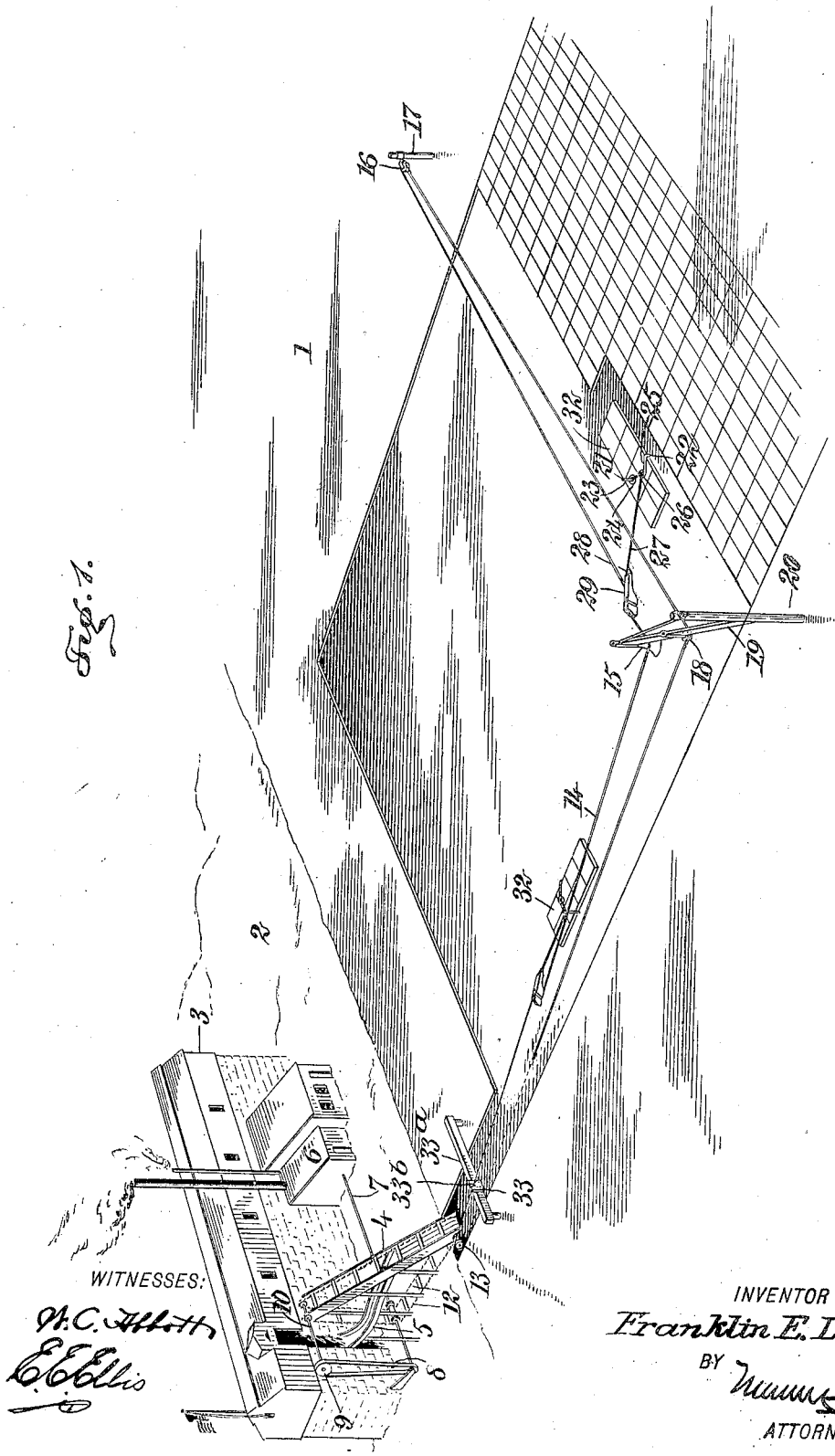
WITNESSES:
INVENTOR
Franklin E. Losee
BY
ATTORNEYS

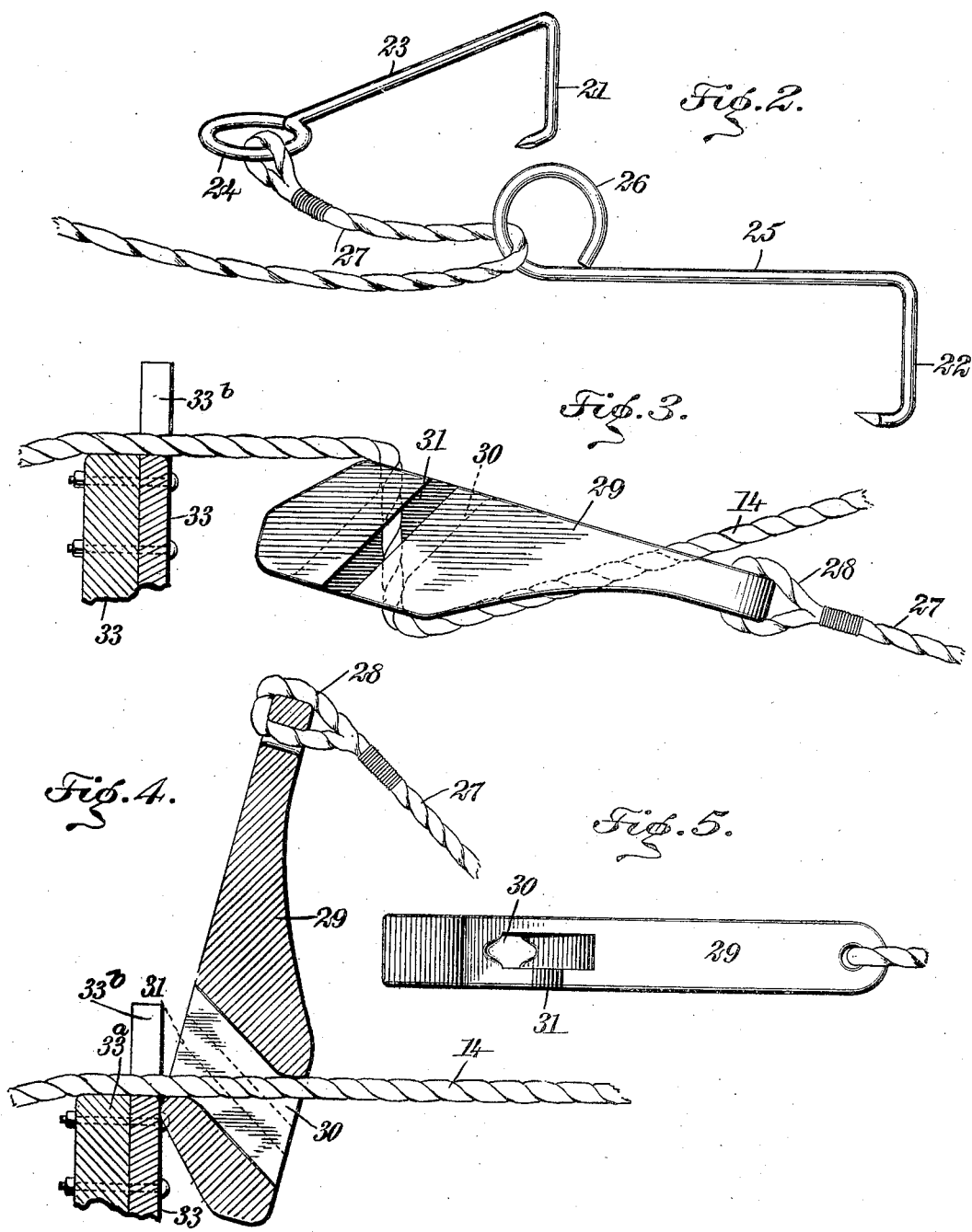

UNITED STATES PATENT OFFICE.

FRANKLIN E. LOSEE, OF NEWTON, NEW JERSEY.

MEANS FOR HARVESTING ICE IN THE FIELD.

No. 828,821.  Specification of Letters Patent.  Patented Aug. 14, 1906.

Application filed October 24, 1905. Serial No. 284,162.

*To all whom it may concern:*

Be it known that I, FRANKLIN E. LOSEE, a citizen of the United States, and a resident of Newton, in the county of Sussex and State of New Jersey, have invented new and Improved Means for Harvesting Ice in the Field, of which the following is a full, clear, and exact description.

This invention relates to means for harvesting ice in the field; and it consists, substantially, in the details of construction and combinations of parts hereinafter more particularly described, and pointed out in the claims.

In the cutting and harvesting of ice in the field (ponds, rivers, &c.) as now frequently practiced the ice is first gone over and cut to a suitable depth on parallel lines by means of special plows for the purpose, thus to mark out the field, after which the ice is again gone over and cut up or divided into large cakes or blocks, which are floated to shore in the manner of rafts, to be further cut up or divided into smaller cakes, which are placed on elevators and conveyed to the ice-house, where they are stored for shipment.

The floating or conveying of the ice cakes or blocks to shore entails a great deal of expense, especially when operating in large fields, since it requires a great many operatives to do the work properly, and besides the work cannot always be carried out with the despatch or expedition desired, as is well known to those skilled in the art.

One of the principal objects of the present invention is to overcome the disadvantages and objections above pointed out and to provide means whereby the expense of harvesting ice in the field may be reduced to a minimum.

A further object is to provide mechanical means for conveying the ice cakes or blocks from the field to the shore in lieu of a manual conveyance thereof, as above explained.

A still further object of the invention is to provide means for the purpose specified which are simple in construction and readily installed, as well as easily controlled, besides being thoroughly effective in operation and possessing the capacity for long and repeated service.

The above and additional objects are attained by means substantially such as are illustrated in the accompanying drawings, in which—

Figure 1 is substantially a diagrammatic perspective view of an ice-field, showing my improvements as mounted thereupon for operation. Fig. 2 is an enlarged view in perspective of one of the sets of grappling-hooks employed, together with the draw-cable therefor. Fig. 3 is an enlarged side view of one of the grips employed, together with a portion of the endless cable which carries the same, and also showing in section the abutment for releasing the grip from the cable at a certain point in the travel of the latter. Fig. 4 is a longitudinal sectional view of one of the grips employed and illustrating the manner in which it is operated on encountering the abutment by which to be released from frictional engagement from the endless cable, and Fig. 5 is a plan view of the grip.

Before proceeding with a more detailed description it may be stated that in the form of my improvements herein shown I employ an endless traveling cable, together with suitable guides therefor, carried by supports which are erected at the desired places of the ice-field, special means being employed in connection with the cable by which the cakes or blocks of ice may be conveyed from the field directly to shore in the manner presently to be explained. The structure in entirety constitutes practically a conveying apparatus for the cakes or blocks of ice, and it requires the employment of but few operatives in the field to properly apply the said special means to the cakes or blocks in order that the purposes of the apparatus may be effectively carried out.

While I have herein represented my improvements in a certain preferred embodiment, it will be understood that I am not limited thereto in precise detail, since immaterial changes therein may be resorted to coming within the scope of my invention.

Reference being had to the drawings by the designating characters thereon, 1 represents an ice-field, and 2 a portion of the surrounding shore, on which may be erected one or more ice-houses 3, in which the cakes or blocks of ice are stored for shipment after they have been taken from the field, a suitable elevator 4 being shown by which the cakes or blocks of ice may be carried to any desired height or story of the warehouse and conducted thereto by means of a runway 5 in a manner well understood in the art. Alongside of the ice-house 3 is a power-house 6, from which extends a driven shaft 7, from the outer end of which runs a belt 8, which extends over a pulley 9 on an upper shaft 10, so as to transmit the motion of the said shaft 7 to the elevator-chains 12, which run over and beneath suitable guide-pulleys therefor, as shown. At the lower end of the elevator 4 the spindle for the lower set of pulleys for the elevator-chains is extended at one end and provided with a guide-pulley 13, around which passes an endless traveling cable 14, which also passes around a guide 15 therefor at a suitable part of the ice-field, thence to another guide-pulley 16, supported in any suitable manner, as by means of a post 17, thence around another guide-pulley 18, supported in any suitable manner, as by means of an arm 19, extending from a post 20, also supported at another suitable place in the ice-field, thence back to said guide-pulley 13.

Each operative in the ice-field is provided with a suitable number of sets of specially-constructed grappling-hooks 21 and 22, (see Fig. 2,) the hook 21 having at the end of the shank 23 thereof an eye or loop 24, which in the application of the said grappling-hooks to a cake or block of ice lies flatly or horizontally thereon, and the hook 22 having at the end of its shank 25 an eye or loop 26, which in the application of the grappling-hooks to a cake or block of ice stands thereon in vertical position, as indicated in Fig. 1, and the relative positions of which are also shown in Fig. 2, the said eye or loop 24 having secured thereto one end of a draw-cable 27, which extends through the eye or loop 26 and the other end of which is secured at 28 to one end of a specially-constructed grip 29, of wood or other suitable material, the grip being preferably enlarged at the other end thereof and formed from edge to edge with an opening 30, the walls of which are inclined with respect to the said last-named end of the grip, the latter being also formed in one of its sides with a slot 31 to enable the grip to be applied to the traveling cable 14 after the grappling-hooks 21 and 22 have been placed upon a cake or block 32 of ice and caused to engage or take into the sides thereof, substantially as illustrated in Fig. 1. In applying the grip to the cable the former is held in such position as to bring the said slot 31 therein parallel with the cable, and then as soon as the grip is released the tension upon the cable causes the grip to be carried or turned to the position shown in Fig. 3, the two thereby becoming tightly locked together, as will be understood.

Located a convenient distance from the elevator 4 is an abutment 33 on a bar 33ª, extending across an opening made in the ice for enabling the cakes or blocks thereof to be conveyed to the desired proximity to the elevator, and as the enlarged end of each of said grips 29 encounters or strikes the said abutment 33 the same is tripped or carried to the position indicated in Fig. 4, thus to be released from operative engagement with the cable and without in any manner interfering with the travel of the cable over the severally-mentioned guides therefor or through the slot 33ᵇ therefor in the abutment. As each grip is thus tripped the operative may remove the same from the cable in an obvious manner and employ the same over and over again in the same way, together with the set of grappling-hooks carried thereby, it being understood that the two are never separated from each other except for the purpose of repairing or the like.

It will be seen that as the grip 29 is drawn along by the endless cable 14 the draw-cable 27 will be drawn taut, and inasmuch as the same passes loosely through the eye 26 of the grappling-hooks 22 the two grappling-hooks will be so acted upon as to effectively engage or take hold of the cake of ice around which the same are placed. As the ice cakes are conveyed to the desired place adjacent to the elevator they may be placed on the latter to be delivered to the ice-house in the manner well understood and as already referred to.

Having thus described my invention, I claim as new and desire to secure by Letters Patent—

1. Means for harvesting ice in the field, comprising an endless traveling cable, a grip for application thereto, devices connected with one end of the grip and adapted to take hold of a cake of ice, the other end of said grip being enlarged and having an opening extending from edge to edge, and a slot in one of its sides communicating with the opening to enable the grip to be applied to the cable, and an abutment adapted to engage the enlarged end of the grip to trip the same to release the grip from operative engagement with the cable.

2. Means for harvesting ice in the field, comprising an endless traveling cable, a grip device adapted to be applied thereto, grappling-hooks adapted to take hold of a cake of ice, the said grappling-hooks having shanks provided with eyes, a draw-cable connected at one end to one eye and passing through the other eye, the other end of the said draw-cable being connected with the grip device, and an abutment for the grip device, disposed within the field.

3. Means for harvesting ice in the field, comprising an endless traveling cable, a grip for application thereto, the said grip being formed with an opening extending from edge to edge, the grip having a slot in one of its sides communicating with said opening, devices connected with the grip and adapted to take hold of a cake of ice, and an abutment for the grip, disposed within the field adjacent to the path of travel of the cable.

4. Means for harvesting ice in the field, comprising an endless traveling cable, a device adapted to be applied thereto and other devices connected with said device and adapted to take hold of a cake of ice, embodying grappling-hooks having shanks provided with eyes, and a draw-cable secured to one eye and passing through the other.

5. Means for harvesting ice in the field, comprising an endless traveling cable, a grip for application thereto, and devices connected with the grip adapted to take hold of a cake of ice, said grip being constructed with an opening having inclined walls, and with a slot communicating with the opening.

6. Means for harvesting ice in the field, comprising an endless traveling cable, a grip for application to the cable, a draw-cable connected with one end of the grip, and grappling-hooks connected with the draw-cable and adapted to take hold of a cake of ice, the other end of said grip being enlarged and formed with an opening having inclined walls, the grip having a slot in one of its sides communicating with said opening to enable the grip to be applied to the traveling cable.

In testimony whereof I have signed my name to this specification in the presence of two subscribing witnesses.

FRANKLIN E. LOSEE.

Witnesses:
  G. A. WILLIAMS,
  PETER J. BEEMER.